(12) United States Patent
Li et al.

(10) Patent No.: US 9,123,959 B2
(45) Date of Patent: Sep. 1, 2015

(54) HIGH ENERGY CATHODE MATERIAL

(71) Applicant: Wildcat Discovery Technologies, Inc., San Diego, CA (US)

(72) Inventors: Bin Li, San Diego, CA (US); Marissa Caldwell, San Diego, CA (US); Wei Tong, San Diego, CA (US); Steven Kaye, San Diego, CA (US); Vinay Bhat, San Diego, CA (US)

(73) Assignee: WILDCAT DISCOVERY TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 14/176,704

(22) Filed: Feb. 10, 2014

(65) Prior Publication Data

US 2014/0225029 A1 Aug. 14, 2014

Related U.S. Application Data

(60) Provisional application No. 61/763,195, filed on Feb. 11, 2013.

(51) Int. Cl.
*H01M 4/505* (2010.01)
*C01G 45/12* (2006.01)

(52) U.S. Cl.
CPC ........... *H01M 4/505* (2013.01); *C01G 45/1235* (2013.01); *C01P 2002/32* (2013.01); *C01P 2002/72* (2013.01); *C01P 2006/40* (2013.01); *Y02E 60/122* (2013.01)

(58) Field of Classification Search
USPC ...................................................... 252/182.1
See application file for complete search history.

(56) References Cited

U.S. PATENT DOCUMENTS 5,738,957 A 4/1998 Amine et al.

FOREIGN PATENT DOCUMENTS

JP 10208730 A 8/1998
JP 2011243349 A 12/2011

OTHER PUBLICATIONS

Wu et al. "Effects of heteroatoms on electrochemical performance of electrode materials for lithium ion batteries" Electrochemica Acta, 47 (2002) 3491-3507.*
Amine, "A New Three Volt Spinel Li1+Mn1.5Ni0.5O4 for Secondary Lithium Batteries," J. Electrochem Soc., vol. 143, No. 5, May 1996.
Kim, "Composite 'Layered-Layered-Spinel' Cathode Structures for Lithium-Ion Batteries," Journal of the Electrochemical Society, 160 (1) A31-A38 (2013).
International Search Report and Written Opinion of PCT/US2014/015577 issued May 26, 2014.

* cited by examiner

*Primary Examiner* — Peter F Godenschwager
(74) *Attorney, Agent, or Firm* — Corridor Law Group, P.C.

(57) ABSTRACT

A composition for use in a battery electrode comprising a compound including lithium, manganese, nickel, and oxygen. The composition is characterized by a powder X-ray diffraction pattern having peaks including 18.6±0.2, 35.0±0.2, 36.4±0.2, 37.7±0.2, 42.1±0.2, and 44.5±0.2 degrees 2θ as measured using Cu $K_\alpha$ radiation.

15 Claims, 14 Drawing Sheets

HIGH ENERGY CATHODE MATERIAL

CROSS-REFERENCE TO RELATED APPLICATIONS

This application claims priority to and the benefit of pending U.S. Provisional Application No. 61/763,195 filed Feb. 11, 2013 entitled "High Energy Cathode Material," which application is incorporated herein by reference in its entirety.

GOVERNMENT LICENSE RIGHTS

This invention was made with government support under DE-FE0005382 (Subcontract LS-111201A-MMW) awarded by the Department of Energy. The government has certain rights in the invention.

BACKGROUND OF THE INVENTION

The present invention is in the field of battery technology and, more particularly, in the area of high-energy materials for use in electrodes in electrochemical cells.

Cathodes formed from active materials of the composition $LiM_2O_4$ are a common class of active materials in lithium ion batteries, where M includes a transition metal. The $LiM_2O_4$ active material can have a spinel structure. Transition metals such as manganese have been used as the transition metal in $LiM_2O_4$ active materials and, in some instances, both manganese and nickel have been used.

$LiM_2O_4$ active materials have been studied and characterized. While they are relatively stable and have relatively low synthesis and raw materials costs, they are not an ideal material. For the sake of comparison, a $LiMn_2O_4$ active material has a theoretical gravimetric energy density of about 492 Wh/kg and a $LiMn_{1.5}Ni_{0.5}O_4$ has a theoretical gravimetric energy density of about 691 Wh/kg. Other cathode active materials, such as layered oxide materials, have higher theoretical energy densities. In particular, layered oxides that have been over-lithiated (that is, additional lithium is inserted into the layered oxide structure) can have a theoretical gravimetric energy density of about 1110 Wh/kg.

However, over-lithiated layered oxides (OLO) have some disadvantages, including up to 30% irreversible capacity loss, gas generation on the first cycle, and poor rate capability. Another factor limiting their use is the voltage suppression on cycling due to gradual structure change.

Some work has been done to incorporate additional lithium into $LiM_2O_4$ active materials to improve their energy density. The spinel structure of $LiM_2O_4$ can accommodate more lithium. By adding one lithium to $LiM_2O_4$, the phase $Li_2M_2O_4$ is obtained, which has a theoretical gravimetric energy density of about 1087 Wh/kg. An over-lithiated $LiM_2O_4$ active material may have a lower raw material cost compared to other materials with similar energy density, such as OLO materials. However, the voltage at which this additional lithium is removed from the structure during discharge of the battery is below three volts, which is too low to be of practical use.

These and other challenges can be addressed by certain embodiments of the invention described herein.

BRIEF SUMMARY OF THE INVENTION

Embodiments of the invention include an active material for use in a battery electrode comprising a compound including lithium, manganese, nickel, and oxygen. The compound is characterized by a powder X-ray diffraction pattern substantially the same as the X-ray powder diffraction pattern in FIG. 1 or FIG. 2.

Embodiments of the invention include an active material for use in a battery electrode, comprising a compound represented by the formula (I):

$$Li_xMn_{1.5-a}Ni_{0.5-b}O_{4-w} \quad (I)$$

where $1.6 \le x \le 2.2$; $0 \le a < 1.5$; $0 \le b < 0.5$; and $-2 < w < 2$. In certain embodiments, the compound is characterized by a powder X-ray diffraction pattern substantially the same as the X-ray powder diffraction pattern in FIG. 1 or FIG. 2.

Embodiments of the invention include an active material for use in a battery electrode, comprising a compound represented by the formula (II):

$$Li_xMn_{1.5-a}Ni_{0.5-b}M_{a+b}O_{4-w} \quad (II)$$

where $1.6 \le x \le 2.2$; $0 \le a+b \le 2.0$; $-2 < w < 2$, and M is a dopant. In certain embodiments, the compound is characterized by a powder X-ray diffraction pattern substantially the same as the X-ray powder diffraction pattern in FIG. 1 or FIG. 2.

Embodiments of the invention include batteries having an electrode formed from any of the active materials disclosed above.

Embodiments of the invention include processes for making the active materials disclosed above as described herein.

DETAILED DESCRIPTION OF THE INVENTION

Figure 1:
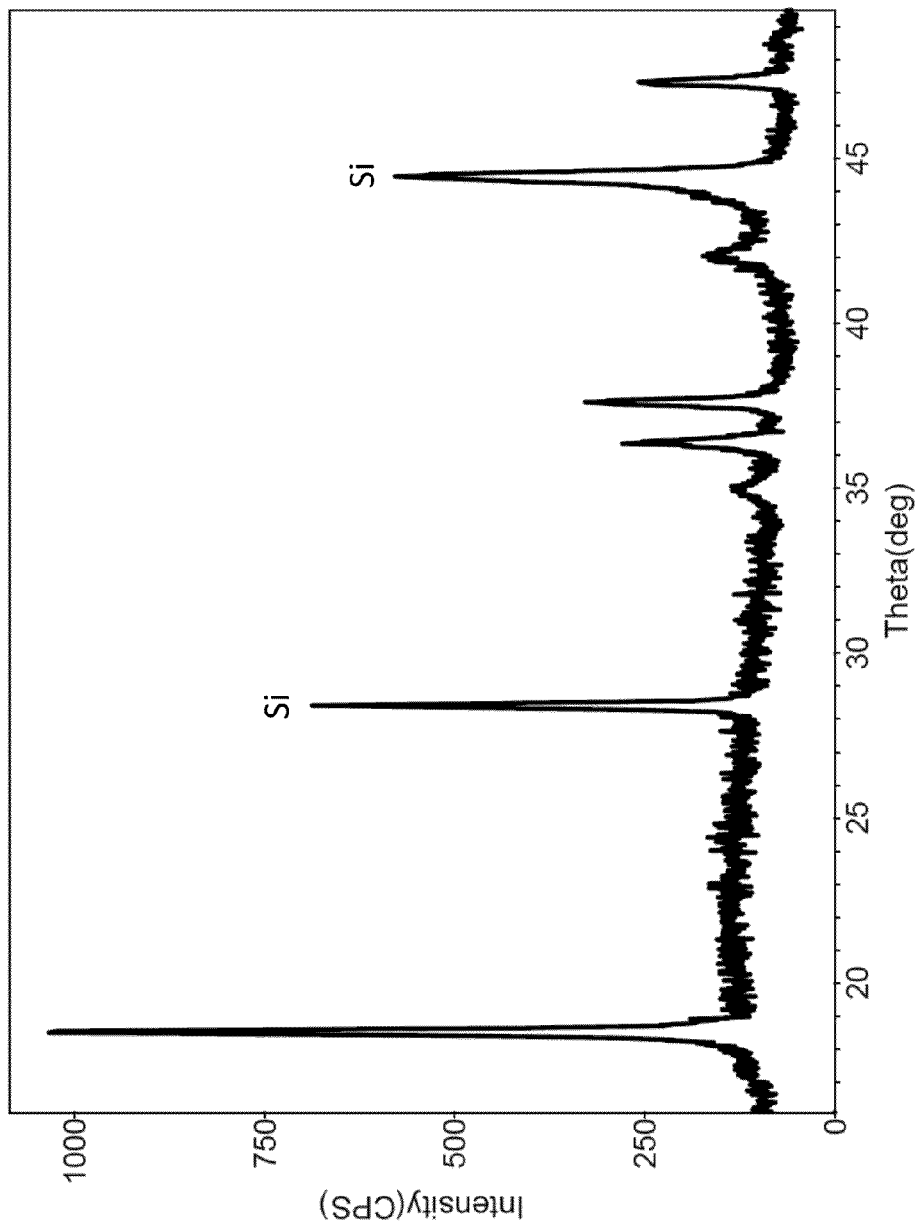
FIGS. 1 and 2 illustrate powder X-ray diffraction patterns of a compound according to embodiments of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "halogen" refers to any of the elements in group 17 of the periodic table, including fluorine (F), chlorine (Cl), bromine (Br), iodine (I), and astatine (At).

The term "lanthanide" refers to any of the fifteen metallic chemical elements with atomic numbers 57 through 71, including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

The term "alkali metal" refers to any of the chemical elements in group 1 of the periodic table, including lithium (Li), sodium (Na), potassium (K), rubidium (Rb), cesium (Cs), and francium (Fr).

The term "alkaline earth metals" refers to any of the chemical elements in group 2 of the periodic table, including beryllium (Be), magnesium (Mg), calcium (Ca), strontium (Sr), barium (Ba), and radium (Ra).

The term "OLS" refers to over-lithiated spinel materials prepared according to methods known in the prior art, including, but not limited to, wet chemical methods such as those disclosed by Tarascon and co-workers (J. Electrochem. Soc., 138 (1991) 2864) demonstrating that $Li_2Mn_2O_4$ can be synthesized by a wet chemical method using acetonitrile and lithium iodide and Amine et. al. (J. Electrochem. Soc., 143 (1996) 1607) showing that $Li_2Mn_2O_4$ can be synthesized using a wet chemical method (a sol-gel method) also using acetonitrile and lithium iodide.

Figure 2:
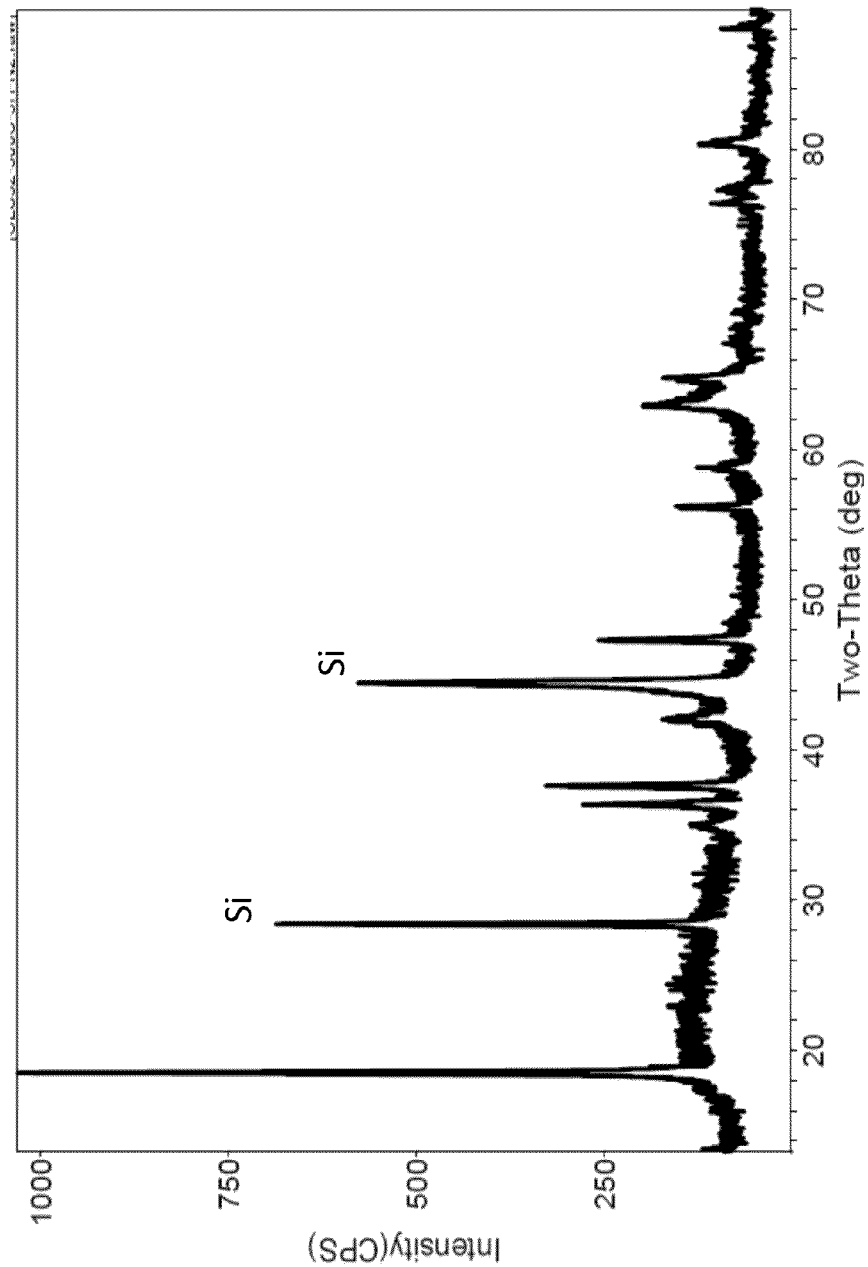

The term "CM3" refers to materials including at least lithium, manganese, nickel, and oxygen and being characterized by a powder X-ray diffraction pattern substantially the same as X-ray powder diffraction pattern in FIG. 1 or 2, as well as functionally or structurally equivalent materials.

The term "specific capacity" refers to the amount (e.g., total or maximum amount) of electrons or lithium ions a material is able to hold (or discharge) per unit mass and can be expressed in units of mAh/g. In certain aspects and embodiments, specific capacity can be measured in a constant current discharge (or charge) analysis, which includes discharge (or charge) at a defined rate over a defined voltage range against a defined counterelectrode. For example, specific capacity can be measured upon discharge at a rate of about 0.05 C (e.g., about 14 mA/g) from 4.95 V to 2.0 V versus a Li/Li+ counterelectrode. Other discharge rates and other voltage ranges also can be used, such as a rate of about 0.1 C (e.g., about 28 mA/g), or about 0.5 C (e.g., about 140 mA/g), or about 1.0 C (e.g., about 280 mA/g).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at 30 degrees C., unless the context clearly dictates otherwise.

Ranges presented herein are inclusive of their endpoints. Thus, for example, the range 1 to 3 includes the values 1 and 3 as well as the intermediate values.

Embodiments of the present invention provide novel materials for use as active materials in cathodes of an electrochemical cell. The materials of the present invention address the challenges described above for existing cathode active materials.

Compounds of embodiments of the invention have been characterized by powder X-ray diffraction. FIG. 1 depicts X-ray diffraction patterns for a CM3 material (as measured using Cu $K_\alpha$ radiation). The diffraction peaks of a silicon standard are shown at about 28.3 degrees 2θ and 47.5 degrees 2θ for calibration purposes. The CM3 material has peaks at 2θ=18.6±0.5 degrees, 35.0±0.5 degrees, 36.4±0.5 degrees, 37.7±0.5 degrees, 42.1±0.5 degrees, and 44.5±0.5 degrees. FIG. 2 depicts the X-ray diffraction patterns for a CM3 material (as measured using Cu $K_\alpha$ radiation) for a wider range of 2θ angles while FIG. 1 is a view of the lower 2θ angle range.

As is known to those of ordinary skill in the art, the peaks in a powder X-ray diffraction pattern correspond to a characteristic dimension between planes in a crystal structure. A slight shift in the position of a peak can mean that a characteristic dimension, such as a lattice parameter in a crystalline form, has shortened or lengthened. A slight shift can alternately signify that the crystalline form has changed morphology and different planes have emerged that give rise to a lattice parameter that is coincidentally slightly shifted from the original position of the peak. Thus, the x-ray diffraction patterns identify a particular crystalline structure for a compound.

Figure 3A:
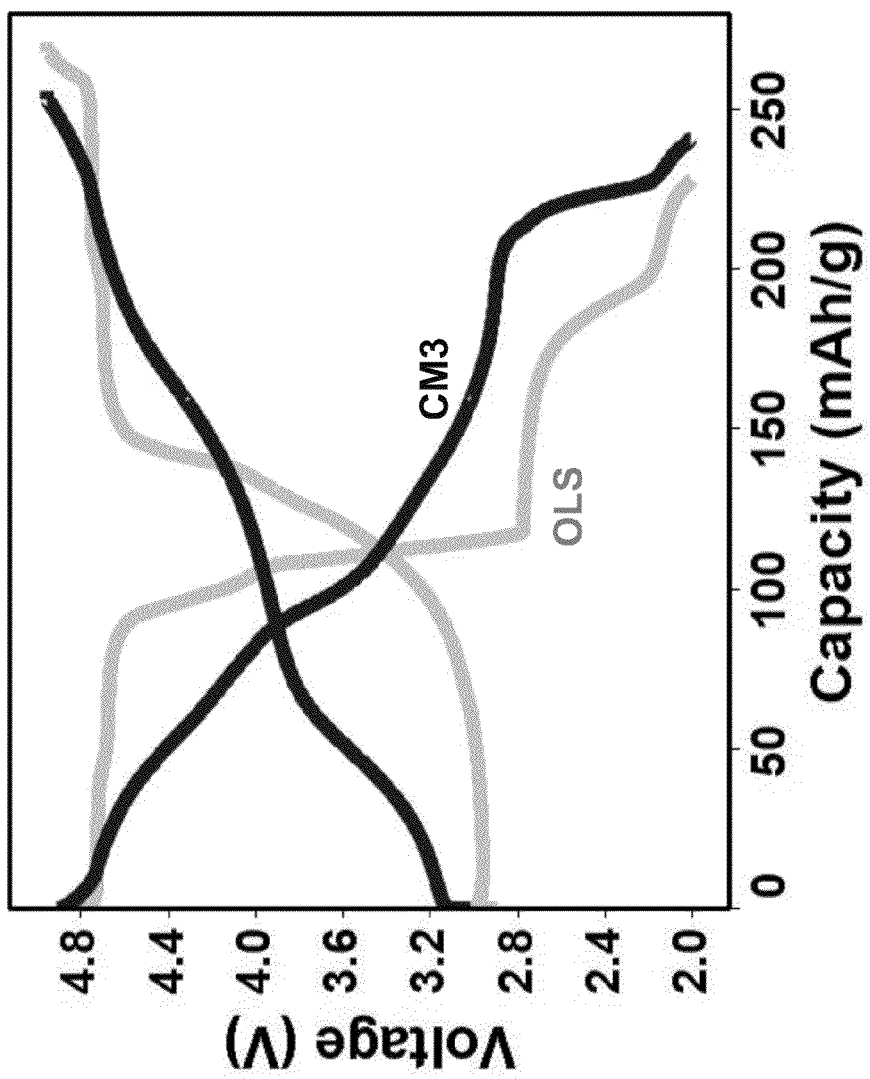
FIGS. 3A and 3B illustrate the results of constant current charge and discharge cycles comparing a compound according to embodiments of the invention to a conventional OLS compound.
Figure 3B:
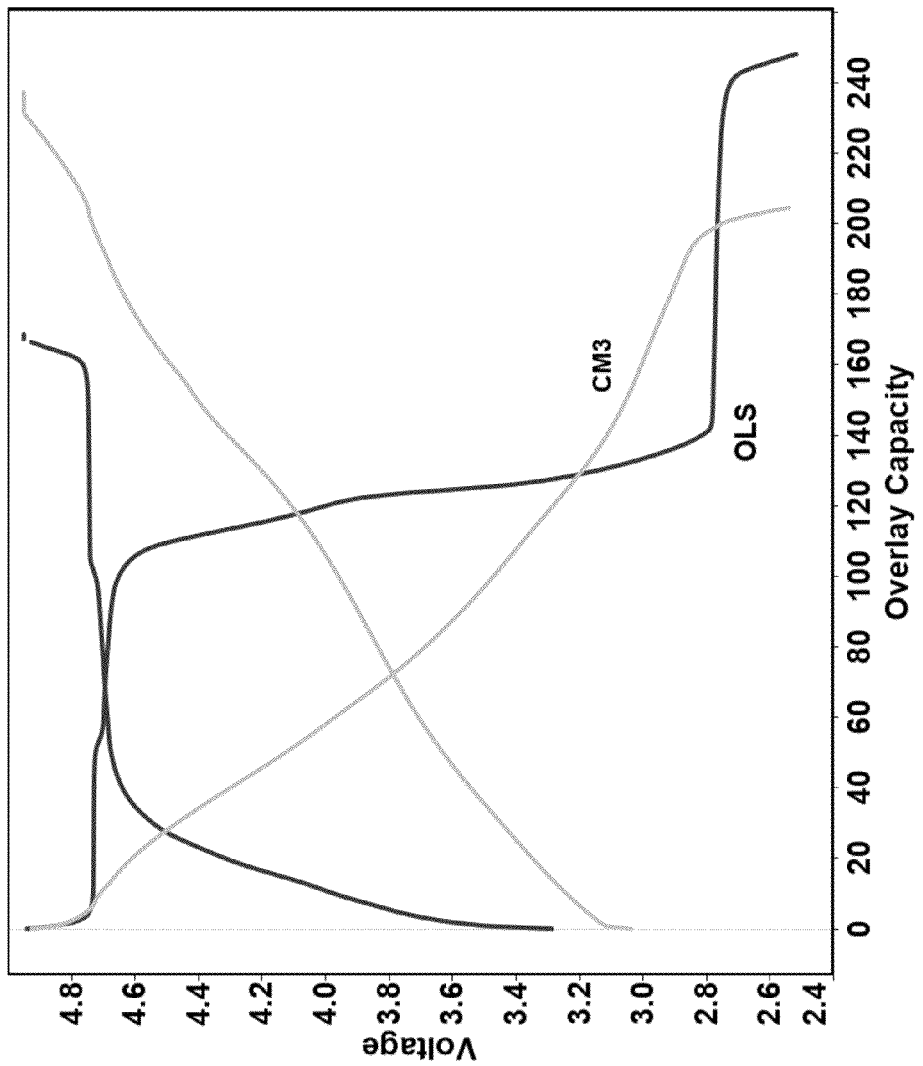

FIGS. 3A and 3B illustrate testing of a novel compound using the testing protocols described in the examples below compared to the known OLS material. FIG. 3A demonstrates improved performance by a CM3 compound as compared to conventional OLS materials. For example, the CM3 compound demonstrates a higher voltage at the same capacity for many parts of the voltage traces. Also, the CM3 compound stays above the critical moisture stability limit of 2.8 V for more of the trace than the OLS material. FIG. 3B demonstrates similar performance at voltages near 2.8 V. That is, in both FIGS. 3A and 3B, the CM3 compound has higher capacity and the trace for the CM3 compound does not have the same "plateau" shape seen in the trace for the OLS compound around 2.8 V. In the testing depicted in FIGS. 3A and 3B the voltage ranged from about 2.0 V to about 4.95 V. The rate was C/20. FIG. 3A confirms improved properties for the CM3 compound. Further, the CM3 compound demonstrates a characteristic voltage profile that is distinct from that of the conventional OLS material. The 1st cycle coulombic efficiency was calculated during this testing and it was observed to be improved for the CM3 compound as compared to the conventional OLS material: the CM3 compound had a coulombic efficiency of 94.2% as compared to a coulombic efficiency of 83.8% for the OLS material.

Figure 4:
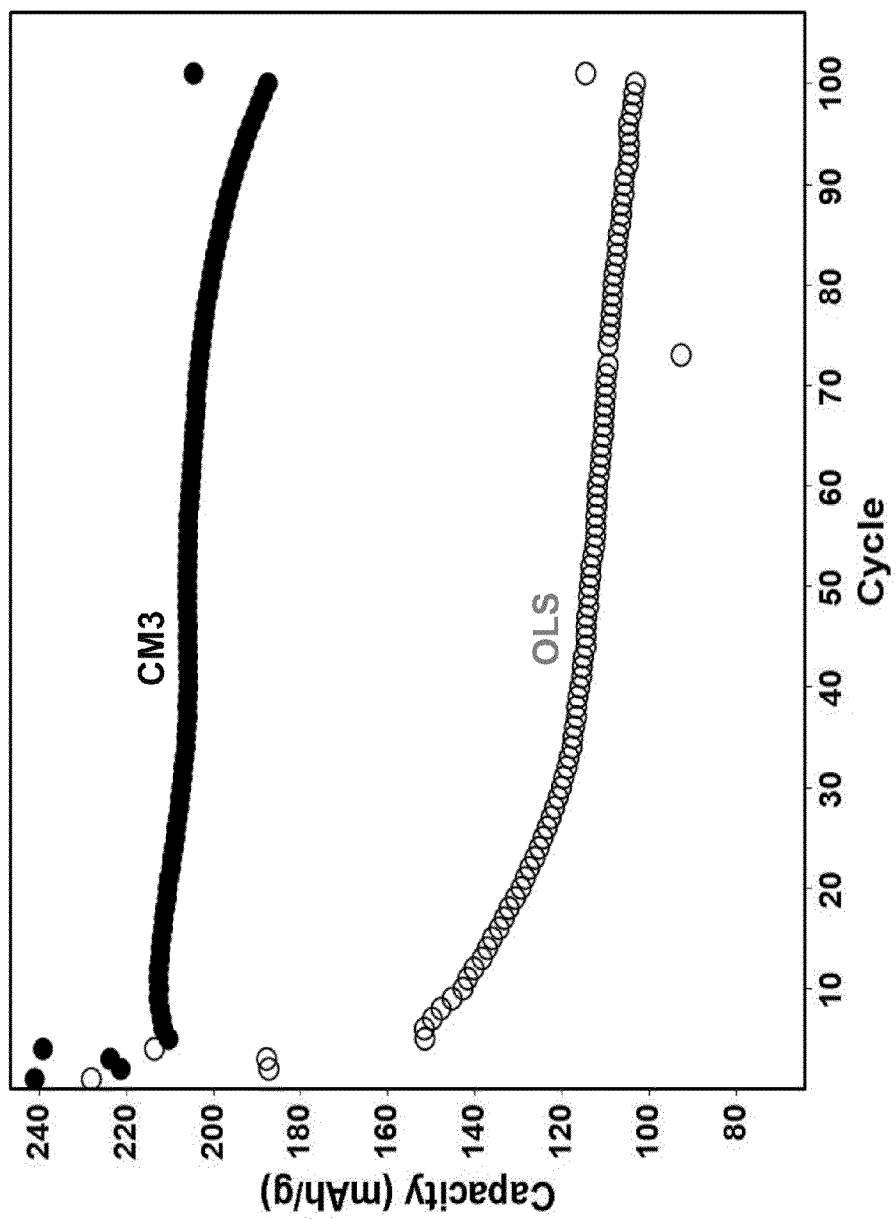
FIG. 4 illustrates the results of cycle-life testing comparing a compound according to embodiments of the invention to a conventional OLS compound.

FIG. 4 illustrates testing according to protocols described in the examples below. A CM3 compound according to certain embodiments was tested and compared to a known OLS material. FIG. 3 demonstrates significant improvement in the specific capacity, the rate capability, and the cycle life of the CM3 compound. In this testing, the voltage ranged from about 2.0 V to about 4.95 V. The cycling rate was C/5 for cycles 5 to 100 and the cycling rate was slower for cycles 1 to 4 and cycle 101.

CM3 compounds of certain embodiments of the invention can demonstrate an energy density of approximately 950 Wh/Kg, which is comparable to next generation cathode materials such as lithium-rich layered oxides. The CM3 compound demonstrated initial specific capacity of greater than 200 mAh/g as measured by discharging a cell at less than 5 mA/g from 4.95 V to 2.5 V (vs. a Li/Li$^+$ anode).

CM3 compounds according to embodiments of the invention demonstrate improved electrochemical properties as compared to known OLS materials, such as specific capacity, the rate capability, and cycle life. In these ways, CM3 compounds of embodiments of the invention address certain challenges that limit the widespread use of known OLS materials.

Conventional OLS materials for use in certain embodiments can be prepared following synthetic routes generally represented by the following formulas (i) and (ii), although it is understood that these formulas are non-limiting and other equivalent synthetic routes for producing conventional OLS materials may be used. Formula (i) depicts the mixing of a stochiometric amount of three components where the components are first milled together.

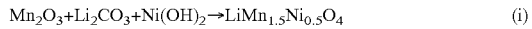
$Mn_2O_3 + Li_2CO_3 + Ni(OH)_2 \rightarrow LiMn_{1.5}Ni_{0.5}O_4$ (i)

The milled powder is then annealed to obtain the reaction product of formula (i). The annealing can take place, for example, at 700 degrees C. for 12 hours under air flow. The reaction product of formula (i) is a spinel material. The reaction product of formula (i) can then be over-lithiated by, for example, a wet chemical process to yield the reaction product of formula (ii).

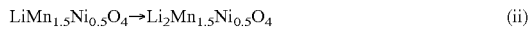
$LiMn_{1.5}Ni_{0.5}O_4 \rightarrow Li_2Mn_{1.5}Ni_{0.5}O_4$ (ii)

The spinel material is heated in the presence of acetonitrile with lithium iodide as the lithium source. Heating can take place, for example, at 85 degrees C. to obtain the over-lithiated reaction product of formula (ii). The reaction product of formula (ii) is an over-lithiated spinel material, or OLS.

Having chemically formed the over-lithiated spinel material, in certain embodiments a structurally-distinct lithium rich phase can be prepared according to formula (iii), where the reaction takes place by heating an over-lithiated spinel material for about 5 hours at 300 degrees C. under nitrogen gas:

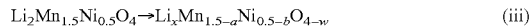
$Li_2Mn_{1.5}Ni_{0.5}O_4 \rightarrow Li_xMn_{1.5-a}Ni_{0.5-b}O_{4-w}$ (iii)

where $1.6 \leq x \leq 2.2$; $0 \leq a < 1.5$; $0 \leq b < 0.5$; and $-2 < w < 2$.

In certain embodiments, the reaction takes place by heating under an inert gas. Without being bound to a particular mode of action or mechanism, it is believed that oxygen content changes during the heating process and therefore w is typically non-zero.

In certain embodiments, the CM3 compound can be formed by heating an OLS material at a temperature greater than about 250 degrees C., greater than about 260 degrees C., greater than about 270 degrees C., greater than about 280 degrees C., greater than about 290 degrees C., greater than about 300 degrees C., greater than about 310 degrees C., greater than about 320 degrees C., greater than about 330 degrees C., or greater than about 340 degrees C. In certain embodiments, the novel compound can be formed by heating an OLS material at a temperature less than about 350 degrees C., less than about 340 degrees C., less than about 330 degrees C., less than about 320 degrees C., less than about 310 degrees C., less than about 300 degrees C., less than about 290 degrees C., less than about 280 degrees C., less than about 270 degrees C., or less than about 260 degrees C. In certain embodiments, the novel compounds can be formed by heating an OLS material at a temperature in a range from about 250 degrees C. to about 350 degrees C., from about 260 degrees C. to about 350 degrees C., from about 270 degrees C. to about 350 degrees C., from about 280 degrees C. to about 350 degrees C., from about 290 degrees C. to about 350 degrees C., or from about 300 degrees C. to about 350 degrees C.

In certain embodiments, the novel compound can be formed by heating an OLS material for a time greater than about 0.5 hour, greater than about 1.0 hour, greater than about 1.5 hours, greater than about 2.5 hours, greater than about 3.0 hours, greater than about 3.5 hours, greater than about 4.0 hours, greater than about 4.5 hours, greater than about 5.0 hours, greater than about 5.5 hours, greater than about 6.0 hours, greater than about 6.5 hours, greater than about 7.0 hours, greater than about 7.5 hours, greater than about 8.0 hours, greater than about 8.5 hours, greater than about 9.0 hours, greater than about 9.5 hours, or greater than about 10.0 hours. In certain embodiments, the novel compound can be formed by heating an OLS material for a time less than about 0.5 hour, less than about 1.0 hour, less than about 1.5 hours, less than about 2.5 hours, less than about 3.0 hours, less than about 3.5 hours, less than about 4.0 hours, less than about 4.5 hours, less than about 5.0 hours, less than about 5.5 hours, less than about 6.0 hours, less than about 6.5 hours, less than about 7.0 hours, less than about 7.5 hours, less than about 8.0 hours, less than about 8.5 hours, less than about 9.0 hours, less than about 9.5 hours, or less than about 10.0 hours. In certain embodiments, the novel compounds can be formed by heating an OLS material for a time in a range from about 0.5 hour to about 10 hours, about 1 hour to about 9.5 hours, about 1.5 hours to about 9 hours, about 2.0 hours to about 8.5 hours, about 2.5 hours to about 8.0 hours, about 3.0 hours to about 7.5 hours, about 3.5 hours to about 7.0 hours, about 4.0 hours to about 6.5 hours, about 4.5 hours to about 6.0 hours, or about 5.0 hours to about 5.5 hours.

Figure 5:
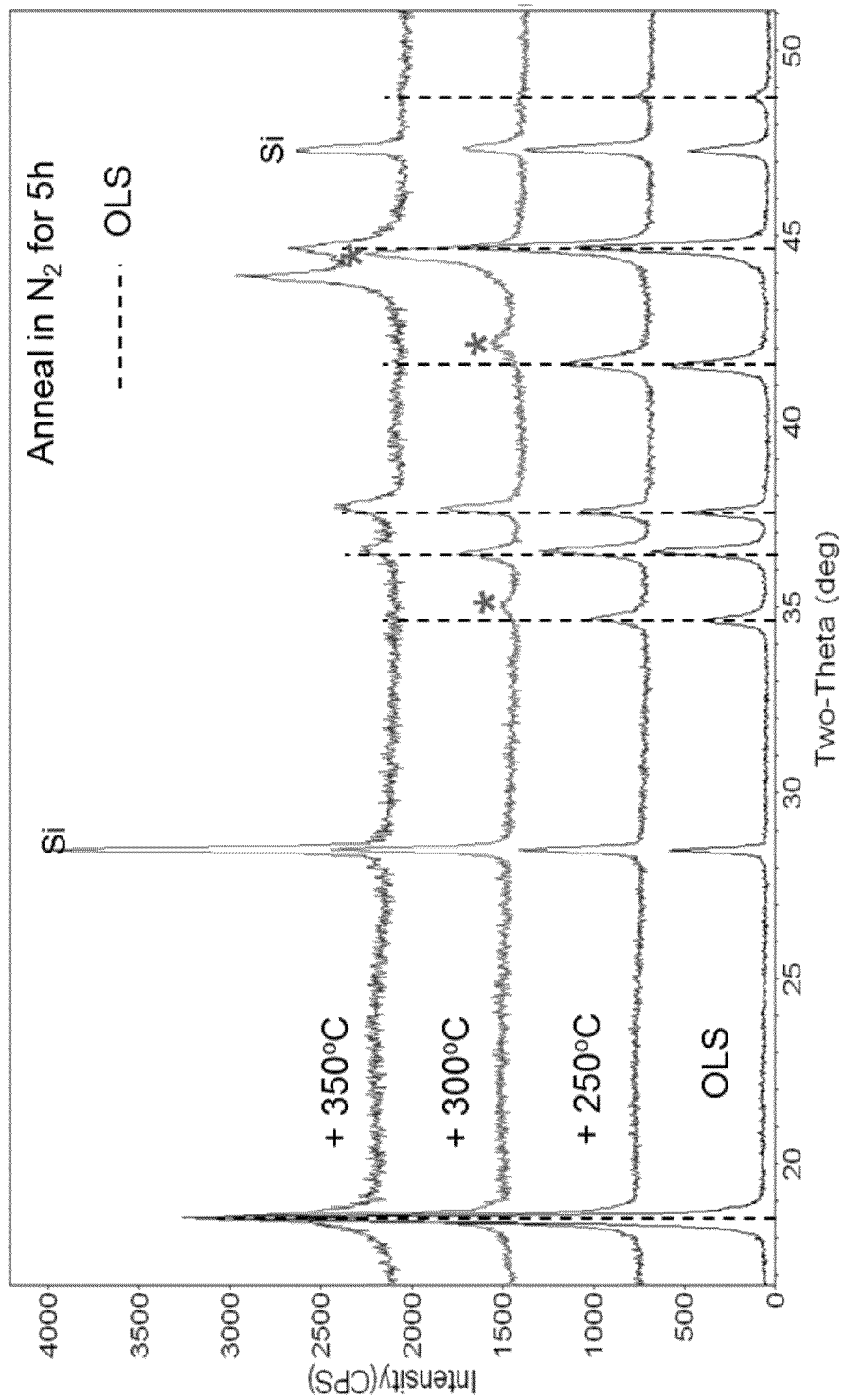
FIG. 5 illustrates X-ray diffraction patterns from various compounds, including a compound according to embodiments of the invention.

FIG. 5 illustrates X-ray diffraction patterns from various compounds, including a CM3 compound according to embodiments of the invention. The CM3 compound has certain peaks that coincide with the peaks of the OLS material and certain peaks that have shifted as compared to the OLS material. The shifted peaks indicate that the CM3 compound is structurally distinct from the OLS material. For example, the peak present in the X-ray diffraction pattern of the OLS material at about 34.7 degrees 2θ is shifted in the CM3 compound to about 35 degrees 2θ. Similarly, the peak present in the X-ray diffraction pattern of the OLS material at about 41.4 degrees 2θ is shifted in the CM3 compound to about 42.1 degrees 2θ. Also, the peak present in the X-ray diffraction pattern of the OLS material at about 44.6 degrees 2θ is shifted in the CM3 compound to about 44.5 degrees 2θ. Further, the relative intensities of certain peaks are different in the CM3 compound as compared to the OLS material. Table 1 below lists certain peaks and their relative intensities. Of course, relative intensities can vary for a given material for reasons including morphology.

TABLE 1

Peak locations and intensities

| OLS | | CM3 | |
|---|---|---|---|
| 2θ | Intensity | 2θ | Intensity |
| 18.5 | 100 | 18.6 | 100 |
| 34.7 | 21 | 35 | 13 |
| 36.5 | 31 | 36.4 | 27 |
| 37.5 | 22 | 37.7 | 32 |
| 41.4 | 19 | 42.1 | 17 |
| 44.6 | 44 | 44.5 | 56 |

By contrast, peak present in the X-ray diffraction pattern of the OLS material are also present and unshifted in the OLS that has been heated for about 5 hours at 250 degrees C. under nitrogen gas. From comparison of these X-ray diffraction patterns it can be concluded that the OLS material is stable and relatively unchanged after being heated for about 5 hours at 250 degrees C. under nitrogen gas.

Certain characteristically shifted peaks of the CM3 compound are not shifted in the X-ray diffraction pattern of the OLS material heated at 350 degrees C. For example, the peaks in the X-ray diffraction pattern of the CM3 compound at about 35 degrees 2θ and at about 42.2 degrees 2θ appear to be missing from the X-ray diffraction pattern of the OLS material heated at 350 degrees C. for 5 hours. Also, the peak in the X-ray diffraction pattern of the CM3 compound at about 44.3 degrees 2θ appears to be shifted back in the OLS material heated at 350 degrees C. for 5 hours to be aligned with the peak at about 44.5 degrees 2θ that is present in the OLS material.

Thus, FIG. 5 demonstrates the synthesis of a novel compound that forms during a heat treatment at about 300 degrees C. and decomposes to a spinel structure at about 350 degrees C. This novel compound has a structure not previously seen for similar type of material. While the novel compound in this example was prepared by heat treatment of an OLS material, other synthetic routes for forming the novel compound are within the scope of this disclosure. For example, milling methods or other chemical, electrochemical, or physical processing routes (or combinations thereof) may yield the CM3 material and these routes are within the scope of this disclosure.

In another aspect, doped spinel starting materials show improved electrochemical performance after undergoing the processing steps described herein. Copending provisional U.S. Patent Application 61/680,837, the disclosure of which is incorporated by reference herein in its entirety as if independently set forth in this document, discloses certain spinel materials including a spinel material for use in an electrode comprising a doped active material wherein the doped active material is formed from a compound represented by formula (iv):

$$LiMn_{1.5-c}Ni_{0.5-d}M_{c+d}O_4 \quad (iv)$$

where c=0.01 to 1.0, d=0 to 0.49, and M is a dopant. The dopant can be a transition metal, a lanthanide, an alkali metal, an alkaline earth metal, aluminum (Al), silicon (Si), bismuth (Bi), indium (In), lead (Pb), or combinations thereof.

Similar doped spinel materials were used as starting materials for the process disclosed herein. However, the doped materials disclosed herein were over-lithiated using a wet chemical process prior to being assembled into an electrochemical cell, whereas the doped materials disclosed in copending provisional U.S. Patent Application 61/680,837 were over-lithiated after being assembled into an electrochemical cell. For example, the Li, Mn, Ni, and O sites of a starting material of formula (II):

$$Li_xMn_{1.5-a}Ni_{0.5-b}M_{a+b}O_{4-w} \quad (II)$$

where 1.6≤x≤2.2; 0≤a+b≤2.0; −2<w<2, and M is a dopant were doped with various materials. The dopants and their doping sites are presented in Table 2.

TABLE 2

List of doping sites and dopants

| Doping Site | Dopant |
|---|---|
| Li | Ca, Cu, Na, Sb, Sn, Ta, Ti |
| Mn | Al, Ba, Bi, Cr, Ge, Hf, Mo, Sn, Y |
| Ni | Cu, Hf, Mg, Ta |
| O | F, P |

FIGS. 6 through 9 illustrate the effects of the processing method on the properties of these materials as compared to the CM3 material. The dopant amounts (or "a+b" in formula (II)) were typically 0.01, 0.02, 0.05, or 0.1, but other doping amounts are within the scope of this disclosure.

Figure 6:
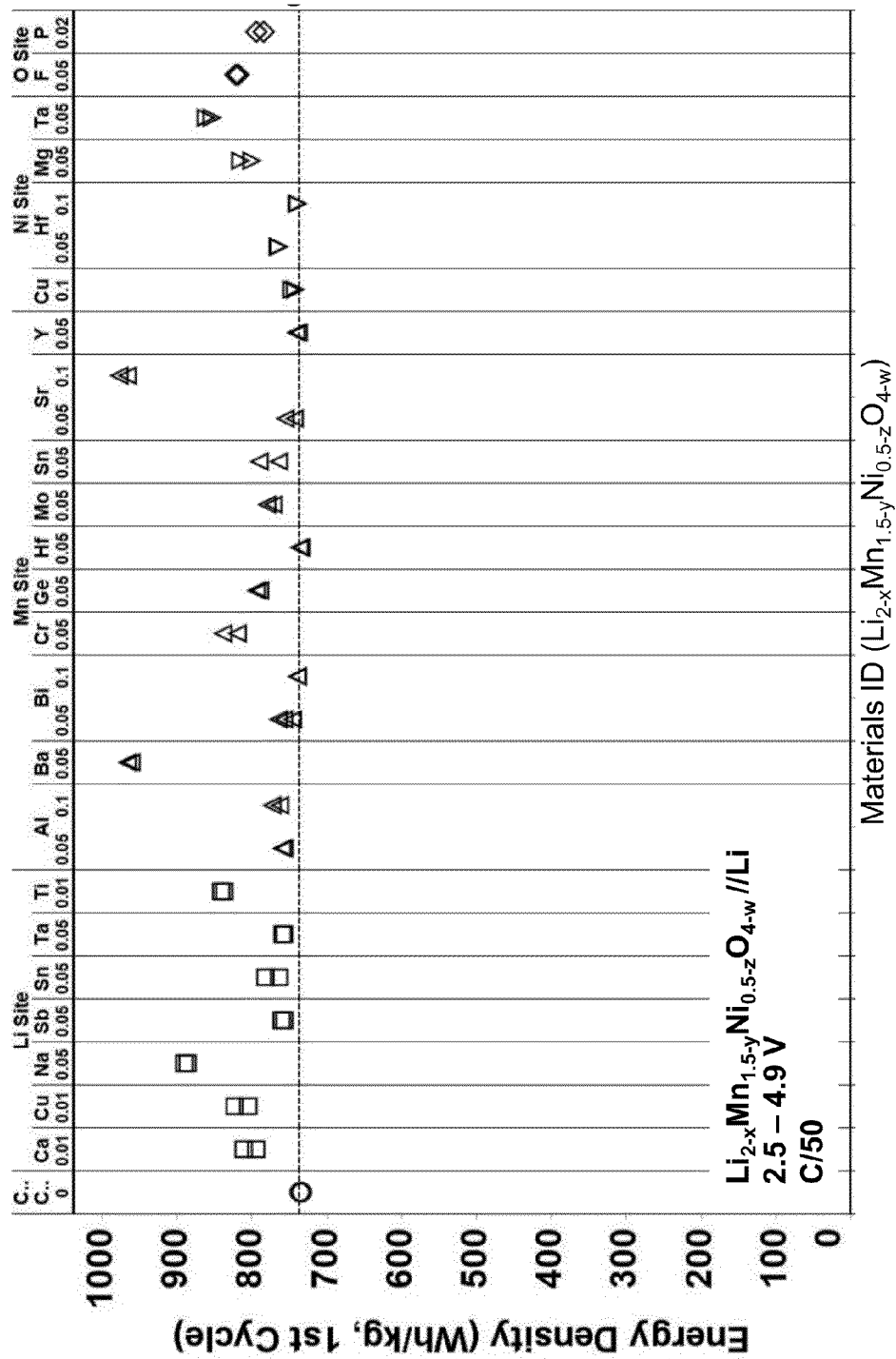
FIG. 6 illustrates the results of energy density measurements comparing doped compounds according to embodiments of the invention to a control compound. Multiple data points indicate multiple measurements.

FIG. 6 illustrates the effect on energy density for various doped materials that were processed under the conditions described herein. For example, doped materials of certain embodiments were heated for about 5 hours at 300 degrees C. under nitrogen gas. For example, a heat-treated OLS material comprising Na doped into the Li site where d=0.05 demonstrated a significant improvement in energy density of about 20% over a CM3 material. In another example, a heat-treated OLS material comprising Ti doped into the Li site where d=0.01 demonstrated a significant improvement in energy density of about 14% over a CM3 material. In another example, a heat-treated OLS material comprising Ba doped into the Mn site where d=0.05 demonstrated a significant improvement in energy density of about 30% over a CM3 material. In another example, a heat-treated OLS material comprising Sr doped into the Mn site where d=0.1 demonstrated a significant improvement in energy density of about 32% over a CM3 material. In another example, a heat-treated OLS material comprising Ta doped into the Ni site where d=0.05 demonstrated a significant improvement in energy density of about 18% over a CM3 material. In another example, a heat-treated OLS material comprising F doped into the O site where d=0.05 demonstrated a significant improvement in energy density of about 12% over a CM3 material. Thus, FIG. 6 demonstrates energy improvement observed for different dopants on all four doping sites.

Figure 7:
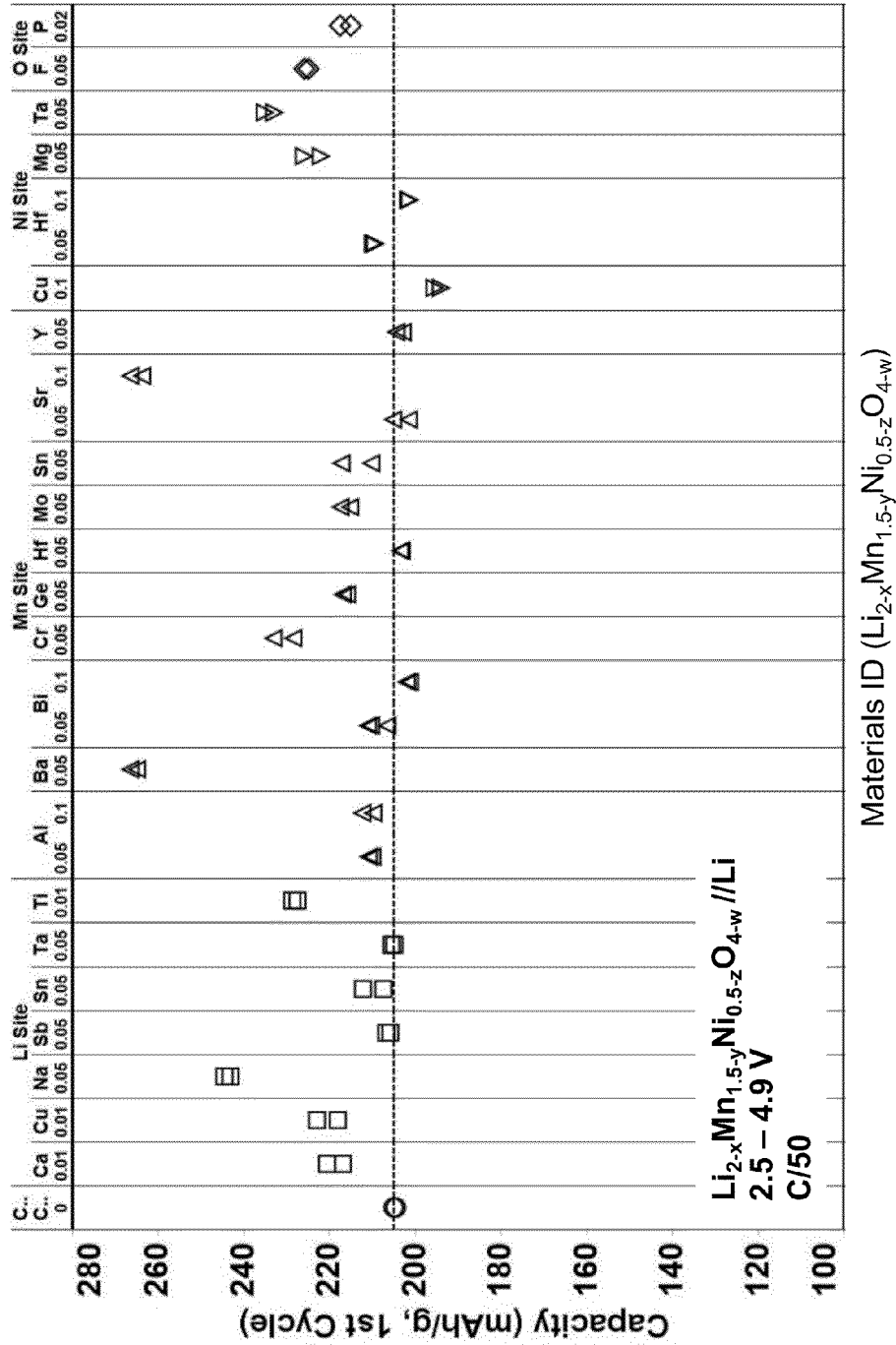
FIG. 7 illustrates the results of first cycle capacity measurements comparing doped compounds according to embodiments of the invention to a control compound. Multiple data points indicate multiple measurements.

FIG. 7 illustrates the effect on capacity for various doped OLS materials that were processed under the conditions described herein. For example, doped OLS materials of certain embodiments were heated for about 5 hours at 300 degrees C. under nitrogen gas. For example, a heat-treated OLS material comprising Na doped into the Li site where d=0.05 demonstrated a significant improvement in capacity of about 20% over a CM3 material. In another example, a heat-treated OLS material comprising Ti doped into the Li site where d=0.01 demonstrated a significant improvement in capacity of about 10% over a CM3 material. In another example, a heat-treated OLS material comprising Ba doped into the Mn site where d=0.05 demonstrated a significant improvement in capacity of about 33% over a CM3 material. In another example, a heat-treated OLS material comprising Sr doped into the Mn site where d=0.1 demonstrated a significant improvement in capacity of about 33% over a CM3 material. In another example, a heat-treated OLS material comprising Ta doped into the Ni site where d=0.05 demonstrated a significant improvement in capacity of about 15% over a CM3 material. In another example, a heat-treated OLS material comprising F doped into the O site where d=0.05 demonstrated a significant improvement in capacity of about 10% over a CM3 material. Thus, FIG. 7 demonstrates capacity improvement observed for different dopants on all four doping sites.

Figure 8:
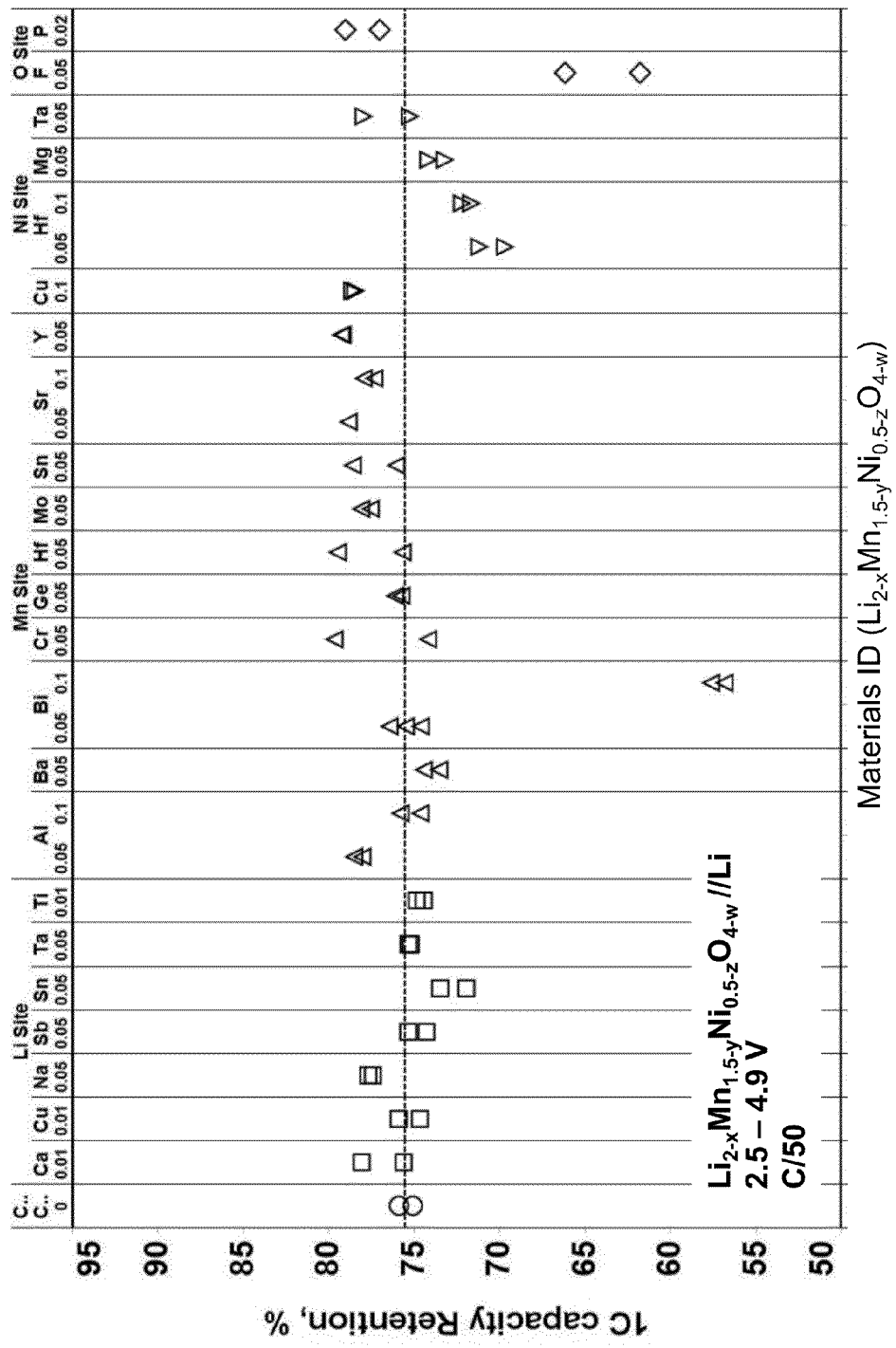
FIG. 8 illustrates the results of capacity retention (1 C over C/50 rate) measurements comparing doped compounds according to embodiments of the invention to a control compound. Multiple data points indicate multiple measurements.

FIG. 8 illustrates the effect on capacity retention (1 C over 0.05 C) for various doped OLS materials that were processed under the conditions described herein. For example, doped starting materials of certain embodiments were heated for about 5 hours at 300 degrees C. under nitrogen gas. For example, a heat-treated OLS material comprising Ca doped into the Li site where d=0.01 demonstrated an improvement in capacity retention of about 3% over a CM3 material. In another example, a heat-treated OLS material comprising Na doped into the Li site where d=0.05 demonstrated an improvement in capacity retention of about 2.5% over a CM3 material. In another example, a heat-treated OLS material comprising Cr doped into the Mn site where d=0.05 demonstrated an improvement in capacity retention of about 5% over a CM3 material. In another example, a heat-treated OLS material comprising Hf doped into the Mn site where d=0.05 demonstrated an improvement in capacity retention of about 5% over a CM3 material. In another example, a heat-treated OLS material comprising Cu doped into the Ni site where d=0.1 demonstrated an improvement in capacity retention of about 4% over a CM3 material. In another example, a heat-treated OLS material comprising Ta doped into the Ni site where d=0.05 demonstrated an improvement in capacity retention of about 2.5% over a CM3 material. In another example, a heat-treated OLS material comprising P doped into the O site where d=0.02 demonstrated an improvement in capacity retention of about 3% over a CM3 material. Thus, FIG. 8 demonstrates capacity retention improvement at a 1 C rate observed for different dopants on all four doping sites.

Figure 9:
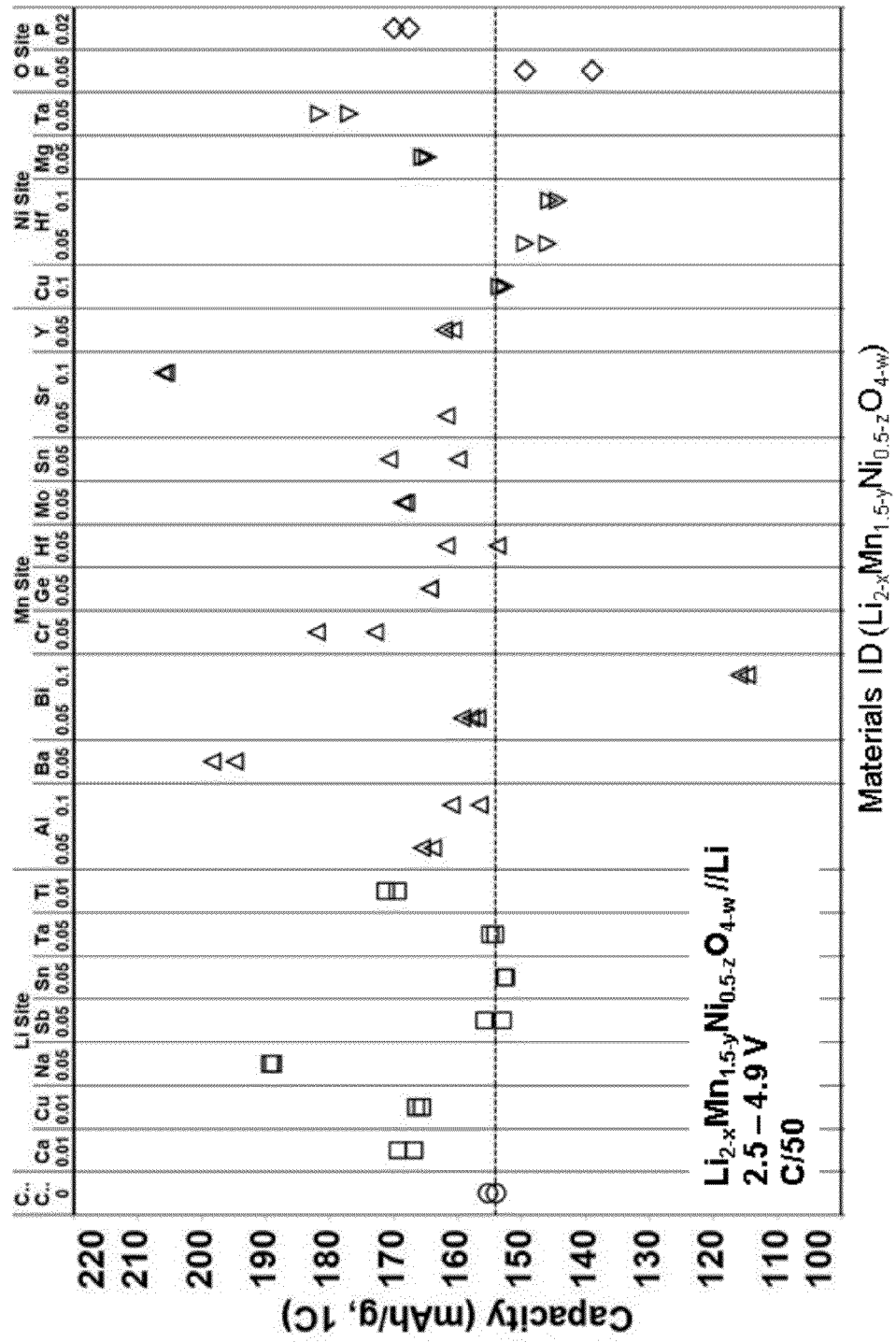
FIG. 9 illustrates the results of 1 C rate capacity measurements comparing doped compounds according to embodiments of the invention to a control compound. Multiple data points indicate multiple measurements.

FIG. 9 illustrates the effect on capacity at 1 C rate for various doped OLS materials that were processed under the conditions described herein. For example, doped OLS materials of certain embodiments were heated for about 5 hours at 300 degrees C. under nitrogen gas. In another example, a heat-treated OLS material comprising Na doped into the Li site where d=0.05 demonstrated a significant improvement in capacity at 1 C rate of about 20% over a CM3 material. In another example, a heat-treated OLS material comprising Ba doped into the Mn site where d=0.05 demonstrated a significant improvement in capacity at 1 C rate of about 25% over a CM3 material. In another example, a heat-treated OLS material comprising Sr doped into the Mn site where d=0.1 demonstrated a significant improvement in capacity at 1 C rate of about 33% over a CM3 material. In another example, a heat-treated OLS material comprising Ta doped into the Ni site where d=0.05 demonstrated a significant improvement in capacity at 1 C rate of about 15% over a CM3 material. In another example, a heat-treated OLS material comprising P doped into the 0 site where d=0.02 demonstrated a significant improvement in capacity at 1 C rate of about 10% over a CM3 material. Thus, FIG. 9 demonstrates rate capability improvement observed for different dopants on multiple doping sites.

Figure 10:
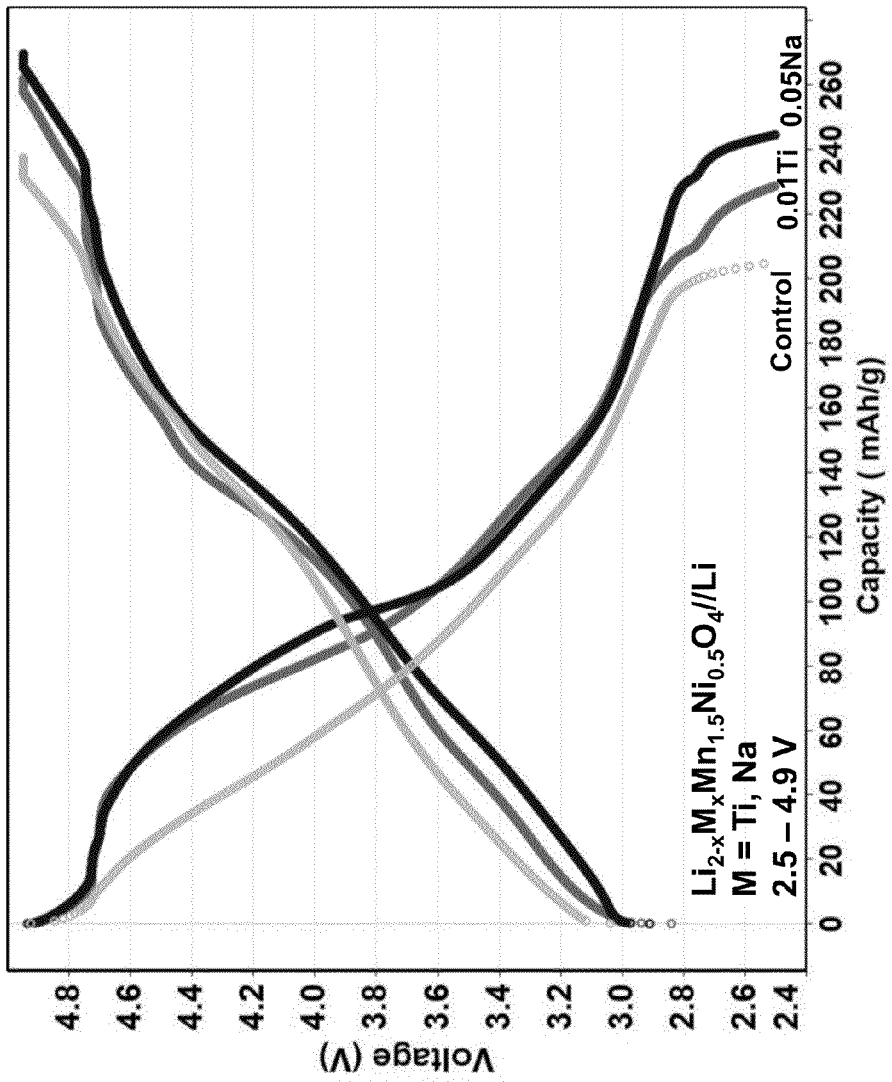
FIG. 10 illustrates the results of constant current charge and discharge cycles comparing doped compounds according to embodiments of the invention to a control compound.

FIG. 10 illustrates voltage vs. capacity traces for charge and discharge cycles for certain doped OLS materials as compared to CM3 materials. FIG. 10 depicts results from testing heat-treated materials in which the Li site has been doped with either Ti (d=0.01) or Na (d=0.05). Both of the doped OLS materials demonstrate performance superior to the CM3 material.

Figure 11:
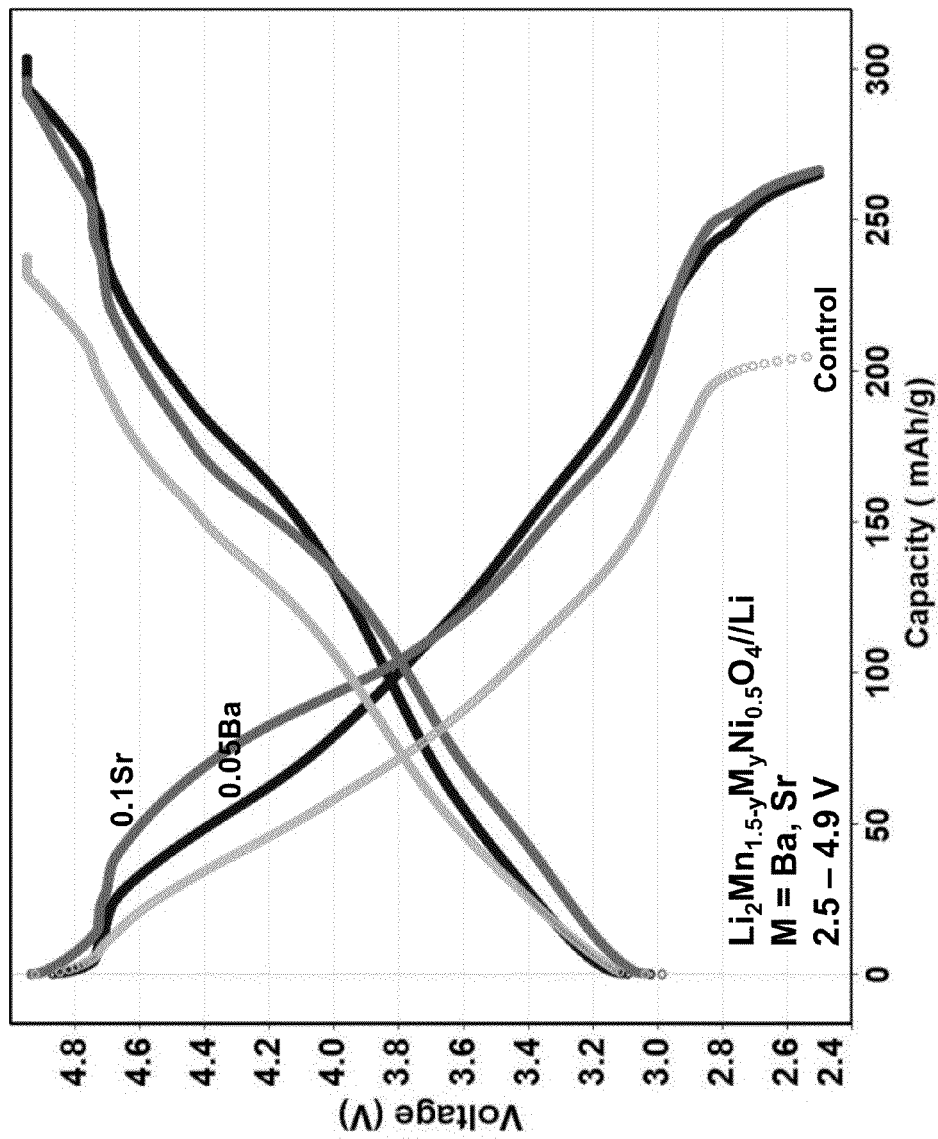
FIG. 11 illustrates the results of constant current charge and discharge cycles comparing doped compounds according to embodiments of the invention to a control compound.

FIG. 11 illustrates voltage vs. capacity traces for charge and discharge cycles for certain doped OLS materials as compared to CM3 materials. FIG. 11 depicts results from testing heat-treated materials in which the Mn site has been doped with either Ba (d=0.05) or Sr (d=0.1). Both of the doped OLS materials demonstrate performance superior to the CM3 material.

Figure 12:
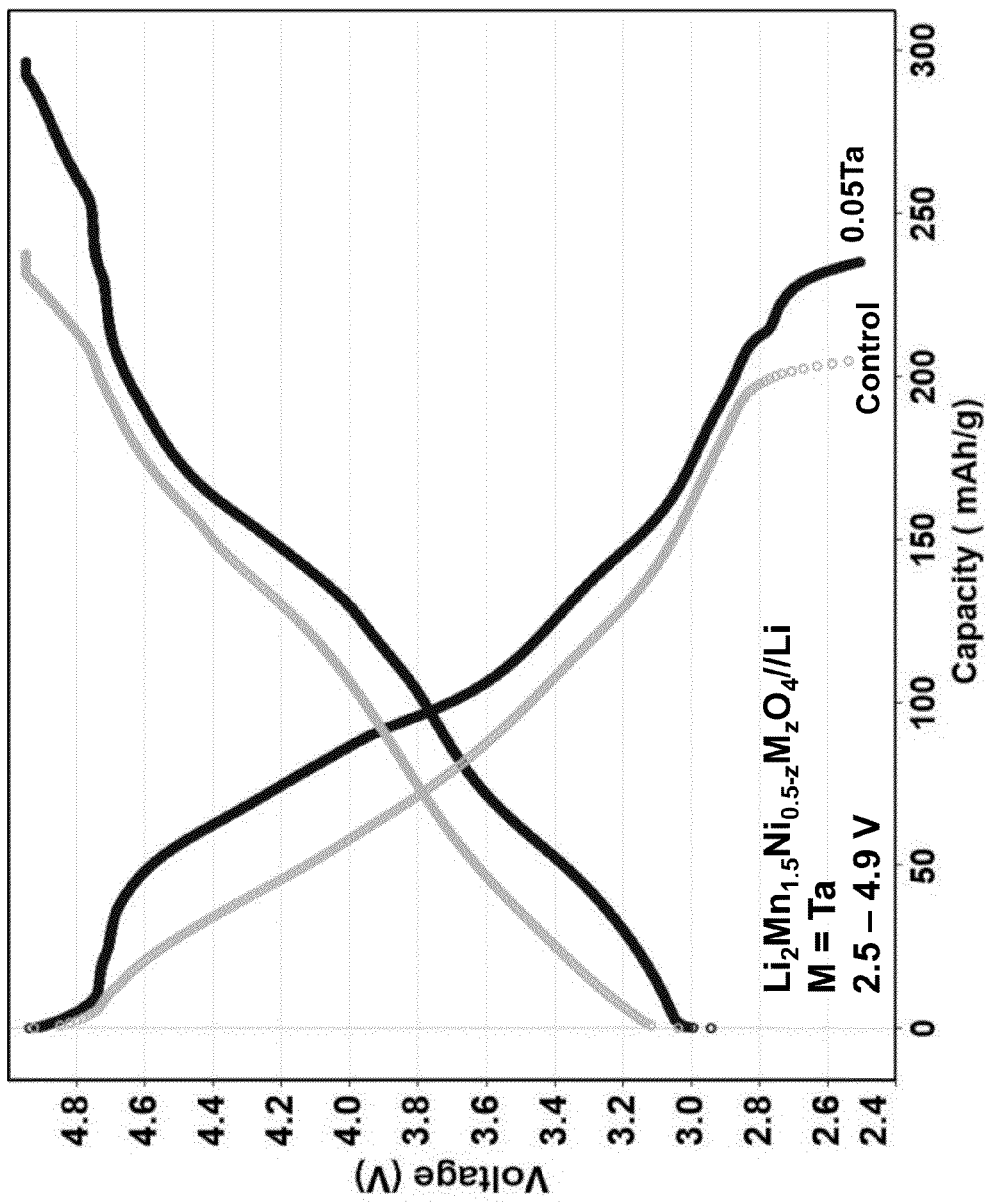
FIG. 12 illustrates the results of constant current charge and discharge cycles comparing doped compounds according to embodiments of the invention to a control compound.

FIG. 12 illustrates voltage vs. capacity traces for charge and discharge cycles for a certain doped OLS material as compared to CM3 materials. FIG. 12 depicts results from testing a heat-treated material in which the Ni site has been doped with Ta (d=0.05). The doped OLS materials demonstrate performance superior to the CM3 material.

Figure 13:
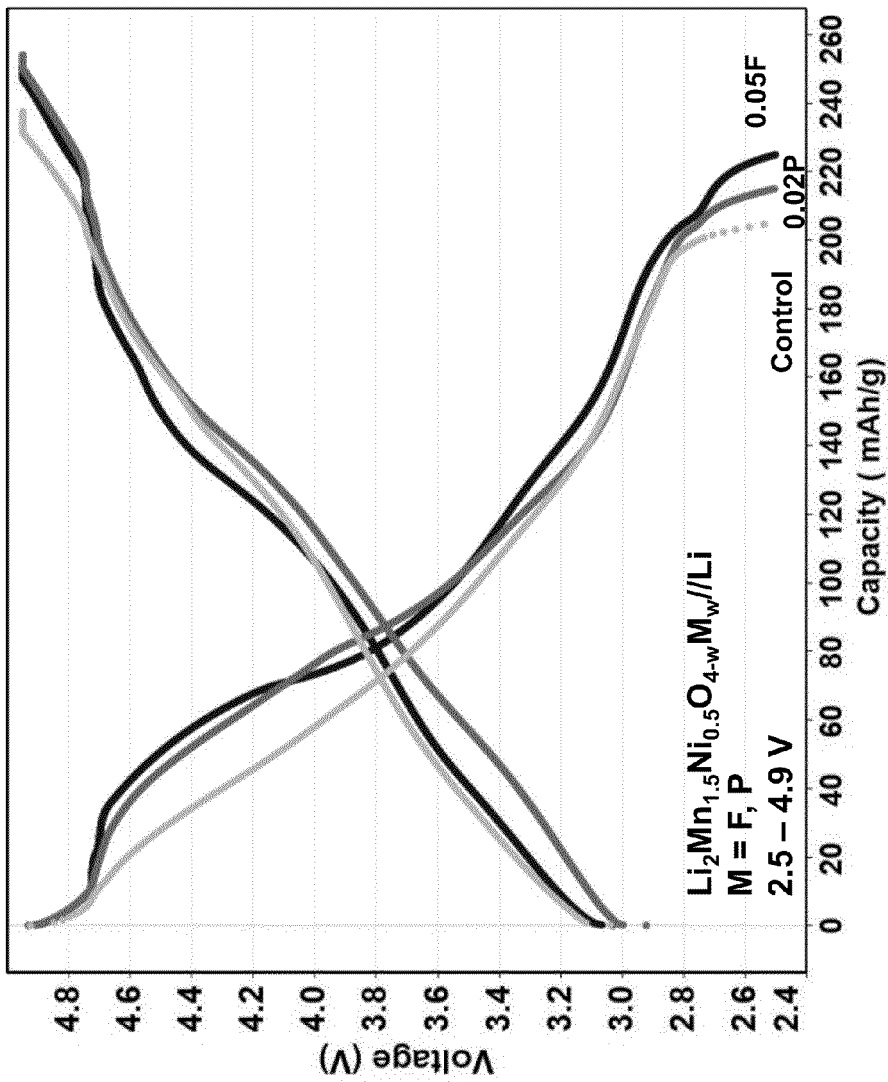
FIG. 13 illustrates the results of constant current charge and discharge cycles comparing doped compounds according to embodiments of the invention to a control compound.

FIG. 13 illustrates voltage vs. capacity traces for charge and discharge cycles for certain doped OLS materials as compared to CM3 materials. FIG. 13 depicts results from testing OLS materials in which the O site has been doped with either P (d=0.02) or F (d=0.05). Both of the doped, heat-treated materials demonstrate performance superior to the CM3 material.

EXAMPLES

Synthesis. Novel compounds were synthesized from over-lithiated spinel $Li_2Mn_{1.5}Ni_{0.5}O_4$ precursors. Initially, stoichiometric amount of precursors ($Mn_2O_3$, $Li_2CO_3$, and $Ni(OH)_2$) were milled in a ballmill and the milled powder was annealed at 700° C. for 12 hours under air flow (20 L/min) to obtain the spinel material $Li_1Mn_{1.5}Ni_{0.5}O_4$. Then, over-lithiated spinel $Li_2Mn_{1.5}Ni_{0.5}O_4$ was made from the spinel by wet chemical lithiation in acetonitrile with lithium iodide as lithium source (Tarascon and co-workers, *J. Electrochem. Soc.*, 138 (1991) 2864). Finally, the CM3 compound was obtained by annealing the OLS under nitrogen at 300 degrees C. for 5 hours.

Synthesis of doped materials. Doped spinel materials were synthesized by milling and annealing processes. Typically, stoichiometric amount of precursors ($Mn_2O_3$, $Li_2CO_3$, $Ni(OH)_2$ and others) were milled and the milled powder was annealed at 700 degrees C. for 12 hours under air flow (20 L/min) to obtain the doped spinel material. The amount of precursor was calculated based on the stoichiometry of the precursor and the final doped material. Stoichiometric amount of precursors were weighed and mixed together. After heating, the material was ground with a mortar and pestle before making the slurry. The resulting doped material was chemically over-lithiated and then heat-treated according to the synthesis described above.

Testing. Battery cells were formed in a high purity argon-filled glove box (M-Braun, $O_2$ and humidity content<0.1 ppm). The electrodes were prepared by the following method:

In case of a cathode, a novel compound was mixed with poly(vinylidene fluoride) (Sigma Aldrich), carbon black (Super P Li, TIMCAL), using 1-methyl-2-pyrrolidinone (Sigma Aldrich) as solvent, and the resulting slurry was deposited on a current collector and dried to form a composite cathode film. In case of an anode, a thin Li foil is cut into the required size and used as anode. Each battery cell, including the composite cathode film, a polypropylene separator, and lithium foil anode, was assembled in a CR2032 coin cell (Hohsen). A conventional electrolyte mixed with an additive was used. The battery cell was sealed and cycled between about 2 V to about 4.95 V at 30° C. Batteries having electrodes made from doped, heat treated materials were tested in a voltage range from about 2.5 V to about 4.95 V.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An active material for use in a battery electrode, comprising:

a compound represented by the formula (I):

$$Li_xMn_{1.5-a}Ni_{0.5-b}O_{4-w} \quad (I)$$

where $1.6 \leq x \leq 2.2$, $0 \leq a < 1.5$, $0 \leq b < 0.5$, and $-2 << 2$, and wherein the compound is characterized by a powder X-ray diffraction pattern as measured using Cu $K_\alpha$ radiation substantially as depicted in FIG. 1.

2. The active material of claim 1 wherein the powder X-ray diffraction pattern includes peaks at 18.6±0.5, 35.0±0.5, 36.4±0.5, 37.7±0.5, 42.1±0.5, and 44.5±0.5 degrees 2θ.

3. The active material of claim 1 wherein the powder X-ray diffraction pattern includes peaks at 18.6±0.2, 35.0±0.2, 36.4±0.2, 37.7±0.2, 42.1±0.2, and 44.5±0.2 degrees 2θ.

4. The active material of claim 1 wherein the powder X-ray diffraction pattern includes peaks at 18.6, 35.0, 36.4, 37.7, 42.1, and 44.5 degrees 2θ.

5. The active material of claim 1 wherein the active material is characterized by having a reversible capacity.

6. An active material for use in a battery electrode, comprising:

a compound represented by the formula (II):

$$Li_xMn_{1.5-a}Ni_{0.5-b}O_{4-w} \quad (I)$$

where $1.6 \leq x \leq 2.2$; $0 \leq a+b \, 2.0$; $-2 << 2$, and M is a dopant and wherein the compound is characterized by a powder X-ray diffraction pattern as measured using Cu $K_\alpha$ radiation substantially as depicted FIG. 1.

7. The active material of claim 6 wherein the dopant is present and is a transition metal, an alkali metal, or an alkaline earth metal.

8. The active material of claim 6 wherein the Li site is the doped site and the dopant is present and is selected from the groups consisting of Ca, Cu, Na, Sb, Sn, Ta, and Ti.

9. The active material of claim 6 wherein the Mn site is the doped site and the dopant is present and is selected from the groups consisting of Al, Ba, Bi, Cr, Ge, Hf, Mo, Sn, and Y.

10. The active material of claim 6 wherein the Ni site is the doped site and the dopant is present and is selected from the groups consisting of Cu, Hf, Mg, and Ta.

11. The active material of claim 6 wherein the O site is the doped site and the dopant is present and is selected from the groups consisting of F and P.

12. An active material for use in a battery electrode, comprising:

a compound represented by the formula (I):

$$Li_xMn_{1.5-a}Ni_{0.5-b}O_{4-w} \quad (I)$$

where $1.6 \leq x \leq 2.2$, $0 \leq a < 1.5$, $0 \leq b < 0.5$, and $-2 << 2$, and wherein the compound is characterized by a powder X-ray diffraction pattern as measured using Cu $K_\alpha$ radiation including peaks at 35.0±0.1 and 42.1±0.1 degrees 2θ.

13. The active material of claim 12 wherein the powder X-ray diffraction pattern further includes a peak at 44.5±0.1 degrees 2θ.

14. The active material of claim 12 wherein the powder X-ray diffraction pattern further includes peaks at 18.6±0.2, 36.4±0.2, and 37.7±0.2 degrees 2θ.

15. A battery electrode comprising the active material of claim 12.

* * * * *

UNITED STATES PATENT AND TRADEMARK OFFICE
CERTIFICATE OF CORRECTION

PATENT NO. : 9,123,959 B2
APPLICATION NO. : 14/176704
DATED : September 1, 2015
INVENTOR(S) : Bin Li et al.

Page 1 of 1

It is certified that error appears in the above-identified patent and that said Letters Patent is hereby corrected as shown below:

Claims:

Column 11, claim 1, line 39, the numerical range '-2<<2' should read -- -2<w<2 --

Column 12, claim 6, line 11 and claim 12, line 34, the numerical range '-2<<2', each occurrence, should read -- -2<w<2 --

Signed and Sealed this
Twenty-first Day of June, 2016

Michelle K. Lee
*Director of the United States Patent and Trademark Office*